April 26, 1949. D. F. KLEINSCHMIDT 2,468,449
RANGE ATTACHMENT FOR MULTITESTERS
Filed April 30, 1948 2 Sheets-Sheet 1
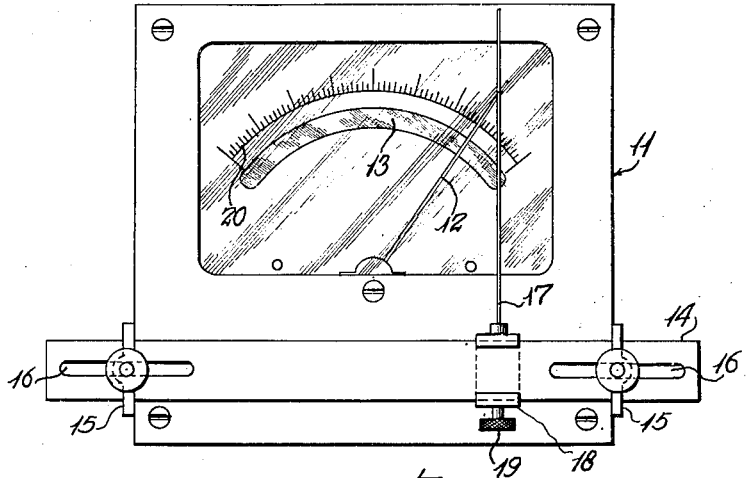
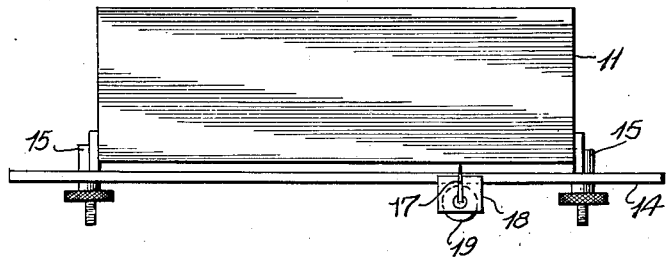
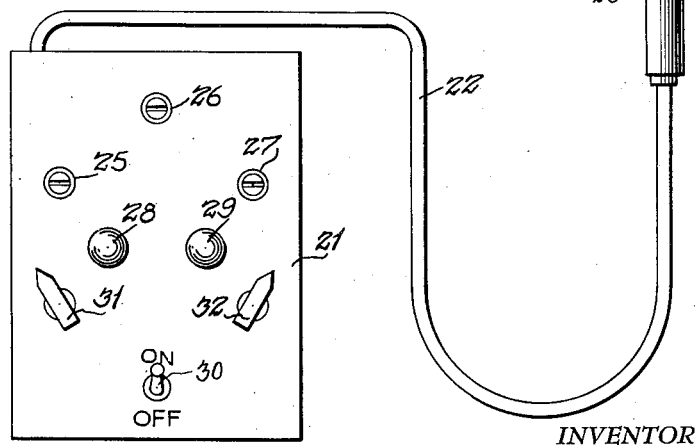
INVENTOR.
Donald F. Kleinschmidt
BY Victor J. Evans & Co.
ATTORNEYS Patented Apr. 26, 1949

2,468,449

UNITED STATES PATENT OFFICE 2,468,449

RANGE ATTACHMENT FOR MULTITESTERS

Donald F. Kleinschmidt, Brookfield, Ill.

Application April 30, 1948, Serial No. 24,394

9 Claims. (Cl. 171—95)

1

This invention relates to interpolation attachments for electrical testing and measuring instruments and more particularly to devices of this character which facilitate the precise reading of deflections involving fractional portions of a scale division.

An object of the invention is to provide a device which can be readily attached to an electrical indicating instrument and which will facilitate interpolation between scale divisions by indicating on an increased scale the increment beyond an even scale division which requires interpolation.

A further object of the invention is the provision of a device of this character which is suitable for use with a multiple range instrument.

Still another object of the invention is the provision of calibrating adjustments within the attachment which will permit its use with indicating instruments of various sensitivities and various internal resistances.

For other objects and for a better understanding of the invention, reference may be had to the following detailed description taken in connection with the accompanying drawing, in which Fig. 1 is an elevational view of an indicating instrument showing an adjustable pointer attachment which forms a part of the invention positioned upon the instrument.

Fig. 2 is a plan view of the arrangement shown in Fig. 1.

Fig. 3 is a plan view of an apparatus case which encloses certain electrical portions of the attachment.

Figure 4:
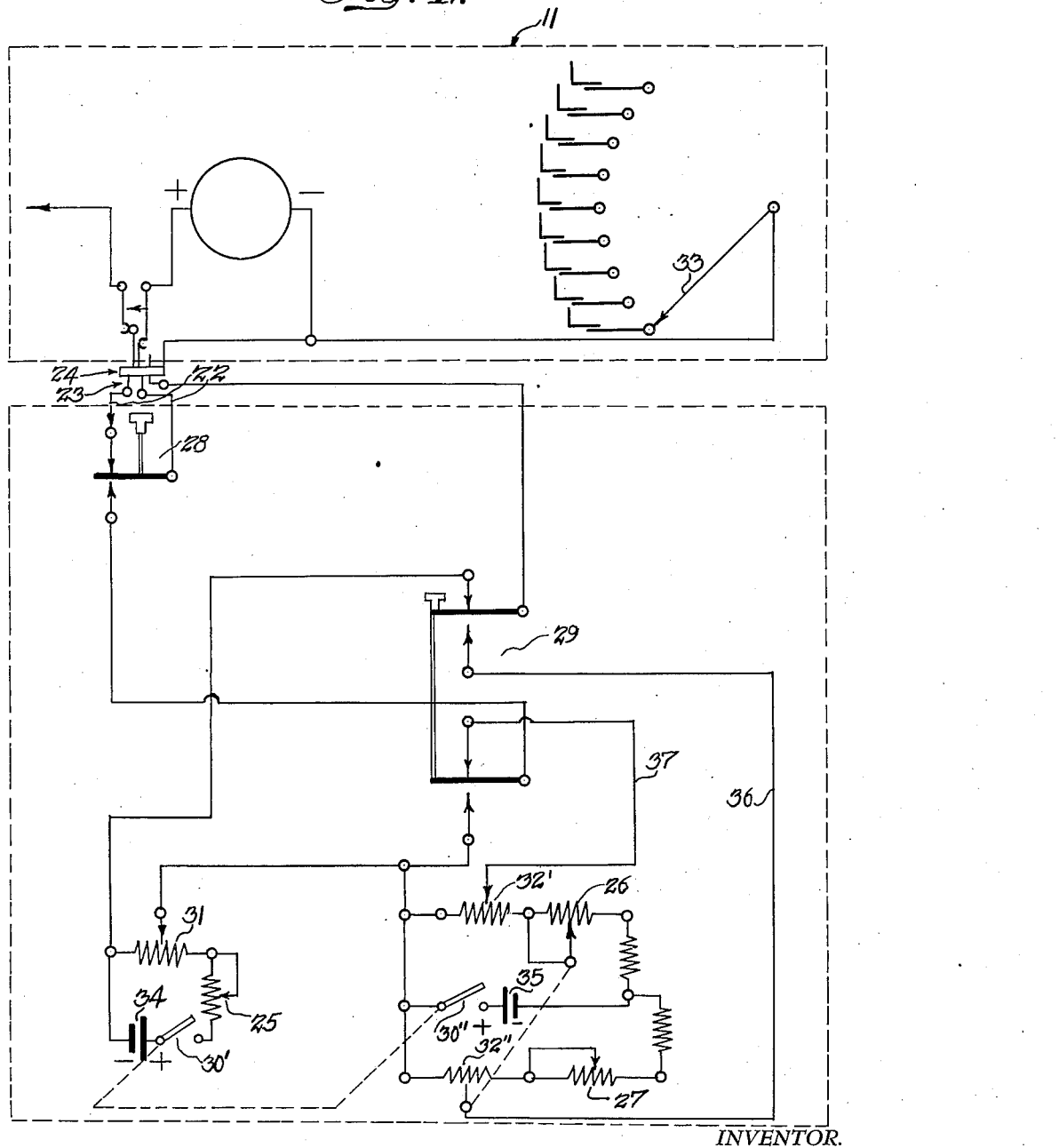
Fig. 4 is a schematic circuit diagram of the invention.

Referring to Fig. 1, there is shown a conventional indicating instrument designated generally as 11 comprising the usual knife-edge pointer 12 and mirror 13 for reducing parallax errors in reading the scale deflections. A transverse bar 14 is removably secured to instrument 11 by clamping members 15 which are adjustably disposed in slots 16. An adjustable knife-edge pointer 17 is secured to clamp 18 which may be positioned at any desired point along bar 14 and secured in such position by tightening a screw 19. It will be apparent that pointer 17 may be carefully moved to the point of intersection of indicating pointer 12 and calibrated scale 20, thus accurately marking an indication of pointer 12 so that it may be duplicated with precision.

The electrical portion of the attachment is shown enclosed within an apparatus case 21 which is shown provided with a three conductor cord 22 and a corresponding plug 23 for conven-

2 ience in connecting the circuits of apparatus case 21 with indicating instrument 11. It is contemplated that instrument 11 be provided with a corresponding three conductor jack 24 arranged to receive and establish connection with plug 23 and to reestablish the measuring circuit associated with instrument 11 when plug 23 is withdrawn. Other well known arrangements for establishing these connections may be used if desired.

Apparatus case 21 contains three adjustable calibrating resistors 25, 26 and 27 which are shown provided with screwdriver adjustments to prevent their settings from being inadvertently disturbed. Case 21 also contains two test switches 28 and 29 and a battery switch 30 together with adjustable test resistors 31 and 32. Battery switch 30 comprises two poles 30' and 30" and test resistor 32 comprises two ganged sections 32' and 32".

In operation, a current or voltage to be measured produces an indication on pointer 12 of instrument 11. This may involve the use of the usual range selector switch in the case of multiple range instruments. Pointer 17 is then carefully adjusted to indicate the precise position of indicating pointer 12 so that the indication of pointer 12 may be accurately duplicated. Battery switch 30 is thrown to the "on" position which closes its two poles 30' and 30" connecting dry cell batteries 34 and 35 to their respective resistance networks.

With test resistors 31 and 32 in their extreme counterclockwise positions, test switch 28 is then operated disconnecting the instrument 11 from the measuring circuit and connecting it to the circuits of the interpolation attachment. Since both test resistors 31 and 32 were in their extreme counterclockwise positions, the instrument 11 will now read zero. Resistor 31 is now turned until the indication of pointer 12 precisely duplicates its indication of the current to be measured as determined by reference to pointer 17. An opposing or bucking voltage is then brought into effect by turning the knob of resistor 32 clockwise until pointer 12 recedes exactly to the even scale division immediately below the indication corresponding to the current or voltage to be measured. This bucking voltage is derived from battery 35 and the branch circuit comprising resistor section 32' and resistor 26.

During the adjustment of resistor 32 to eliminate the fractional part of a division from the measured deflection, the other component section 32" was adjusted simultaneously therewith.

The values of the resistors are so selected that the voltage derived at conductor 36 which is connected to section 32" and resistor 27 will always be a predetermined integral multiple of the voltage derived from section 32' and resistor 26 at conductor 37. For convenience, this multiple will ordinarily have a value such as 10 or 100 although values such as 2 or 5 may be used if desired.

Having eliminated the fractional portion of a division from the indication of pointer 12 and established a voltage corresponding to a predetermined multiple of this fraction of a division across resistor 32", test switch 29 is then operated. Switch 29 connects the voltage derived from section 32" directly to instrument 11 so that its value may be measured. The indication of pointer 12 will then correspond directly to the eliminated fraction of a scale division multiplied by a factor such as 10. The factor corresponds to the value of the predetermined multiple established by the particular values selected for the various resistors.

For calibration for use with any particular measuring instrument, or if the voltages of batteries 34 and 35 should drop with age or use, calibrating resistors 25, 26 and 27 may be adjusted so that correct operation is obtained.

While various changes may be made in the detail construction, it shall be understood that such changes shall be within the spirit and scope of the present invention as defined by the appended claims.

I claim:

1. In a device of the class described adapted for connection to an indicating electrical measuring instrument, a first voltage source, a first adjustable means for applying a portion of the voltage from the source to the instrument for duplicating an indication corresponding to a measurement, a second voltage source connected to oppose the first voltage source, a second adjustable means for applying a portion of the voltage from the second source to reduce the indication obtained from the first voltage source, and multiplying means operatively associated with the second adjusting means for deriving a voltage which is a predetermined multiple of the voltage derived from the second adjustable means.

2. A device as in claim 1 in which each of the adjustable means is a resistor.

3. A device as in claim 1 in which the multiplying means comprises a further adjustable means operated simultaneously with the second adjustable means.

4. In a device of the class described adapted for connection to an indicating electrical measuring instrument, a switch arranged to permit the instrument to be independently connected to the device, a first voltage source, a first adjustable means for applying a portion of the voltage from the source to the instrument for duplicating an indication corresponding to a measurement, a second voltage source connected to oppose the first voltage source, a second adjustable means for applying a portion of the voltage from the second source to reduce the indication obtained from the first voltage source, and multiplying means operatively associated with the second adjusting means for deriving a voltage which is a predetermined multiple of the voltage derived from the second adjustable means.

5. A device as in claim 4 in which each of the adjustable means is a resistor.

6. A device as in claim 4 in which the multiplying means comprises a further adjustable means operated simultaneously with the second adjustable means.

7. In a device of the class described adapted for connection to an indicating electrical measuring instrument, a switch arranged to permit the instrument to be independently connected to the device, a first voltage source, a first adjustable means for applying a portion of the voltage from the source to the instrument for duplicating an indication corresponding to a measurement, a second voltage source connected to oppose the first voltage source, a second adjustable means for applying a portion of the voltage from the second source to reduce the indication obtained from the first voltage source, and multiplying means operatively associated with the second adjusting means for deriving a voltage which is a predetermined multiple of the voltage derived from the second adjustable means, and a further switch arranged to permit independent application of the voltage derived from the multiplying means to the indicating instrument for the measurement thereof.

8. A device as in claim 7 in which each of the adjustable means is a resistor.

9. A device as in claim 7 in which the multiplying means comprises a further adjustable means operated simultaneously with the second adjustable means.

DONALD F. KLEINSCHMIDT.

REFERENCES CITED

The following references are of record in the file of this patent:

UNITED STATES PATENTS

| Number | Name | Date |
|---|---|---|
| 1,164,032 | Thomas | Dec. 14, 1915 |
| 2,229,009 | Berry | Jan. 14, 1941 |